United States Patent [19]

Rylewski

[11] Patent Number: 5,036,906
[45] Date of Patent: Aug. 6, 1991

[54] INDEPENDENT UNIT FOR HEAT EXCHANGE BETWEEN A PRIMARY FLUID AND A SECONDARY FLUID, PARTICULARLY AIR FOR VENTILATION AND AIR CONDITIONING OF A ROOM

[76] Inventor: Eugeniusz M. Rylewski, 43bis, avenue du Gènèral Leclerc, Saint Remy Les Chevreuse, France

[21] Appl. No.: 617,456
[22] PCT Filed: Dec. 16, 1987
[86] PCT No.: PCT/FR87/00504
  § 371 Date: Oct. 6, 1988
  § 102(e) Date: Oct. 6, 1988
[87] PCT Pub. No.: WO88/04757
  PCT Pub. Date: Jun. 30, 1988

Related U.S. Application Data

[63] Continuation of Ser. No. 245,316, Oct. 6, 1988, abandoned.

[30] Foreign Application Priority Data

Dec. 17, 1986 [FR] France ............... 86 17714

[51] Int. Cl.⁵ .......................... F24H 3/02; F24H 3/10; F24F 12/00
[52] U.S. Cl. ......................... 165/54; 165/75; 165/77; 165/164; 165/909
[58] Field of Search ............. 165/54, 77, 166, 167, 165/909, 75, 164; 98/33.1

[56] References Cited

U.S. PATENT DOCUMENTS

| | | | |
|---|---|---|---|
| 441,781 | 12/1890 | Theisen | 165/167 |
| 2,019,351 | 10/1935 | Lathrop | 165/909 |
| 2,056,581 | 10/1936 | Mortensen | 165/77 |
| 2,687,876 | 8/1954 | Hytte | 165/164 |
| 3,157,229 | 11/1964 | Wennerberg | 165/167 |
| 3,559,728 | 2/1971 | Lyman | 165/166 |
| 3,581,649 | 6/1971 | Rauenhorst | 98/33.1 |
| 4,063,590 | 12/1977 | McConnell | 165/909 |
| 4,307,776 | 12/1981 | Grun et al. | 98/33.1 |
| 4,334,577 | 6/1982 | George | 165/909 |
| 4,550,773 | 11/1985 | Martin | 165/54 |
| 4,671,350 | 6/1987 | Toukola | 98/33.1 |

FOREIGN PATENT DOCUMENTS

| | | | |
|---|---|---|---|
| 0029573 | 6/1981 | European Pat. Off. | 165/54 |
| 0074298 | 3/1983 | European Pat. Off. | 98/33.1 |
| 0114241 | 8/1984 | European Pat. Off. | 98/33.1 |
| 2731309 | 1/1979 | Fed. Rep. of Germany | 165/909 |
| 2929875 | 2/1981 | Fed. Rep. of Germany | 165/54 |
| 3226984 | 7/1983 | Fed. Rep. of Germany | 165/164 |
| 3329557 | 5/1984 | Fed. Rep. of Germany . | |
| 3327685 | 2/1985 | Fed. Rep. of Germany . | |
| 1519235 | 2/1968 | France | 165/167 |
| 0187594 | 11/1982 | Japan | 165/166 |
| 0145891 | 8/1983 | Japan | 165/166 |

OTHER PUBLICATIONS

Okada et al, "Design and Heat Transfer Characteristics of New Plate Heat Exchanger", Heat Transfer-Japanese Research, vol. 1, No. 1, Jan.–Mar. 1972, pp. 90-95.

Primary Examiner—John Ford
Attorney, Agent, or Firm—Kane Dalsimer Sullivan Kurucz Levy Eisele and Richard

[57] ABSTRACT

The independent unit for heat exchange particularly for the ventilation of a room or premises is configured like a box (12) wherein are formed two passages (40 and 42) having an undulated shape and wherein circulate in counter-current air drawn in the room and rejected to the outside and outer air introduced into the room. The invention applies particularly to the ventilation and air conditioning of the premises or rooms of a building.

21 Claims, 9 Drawing Sheets

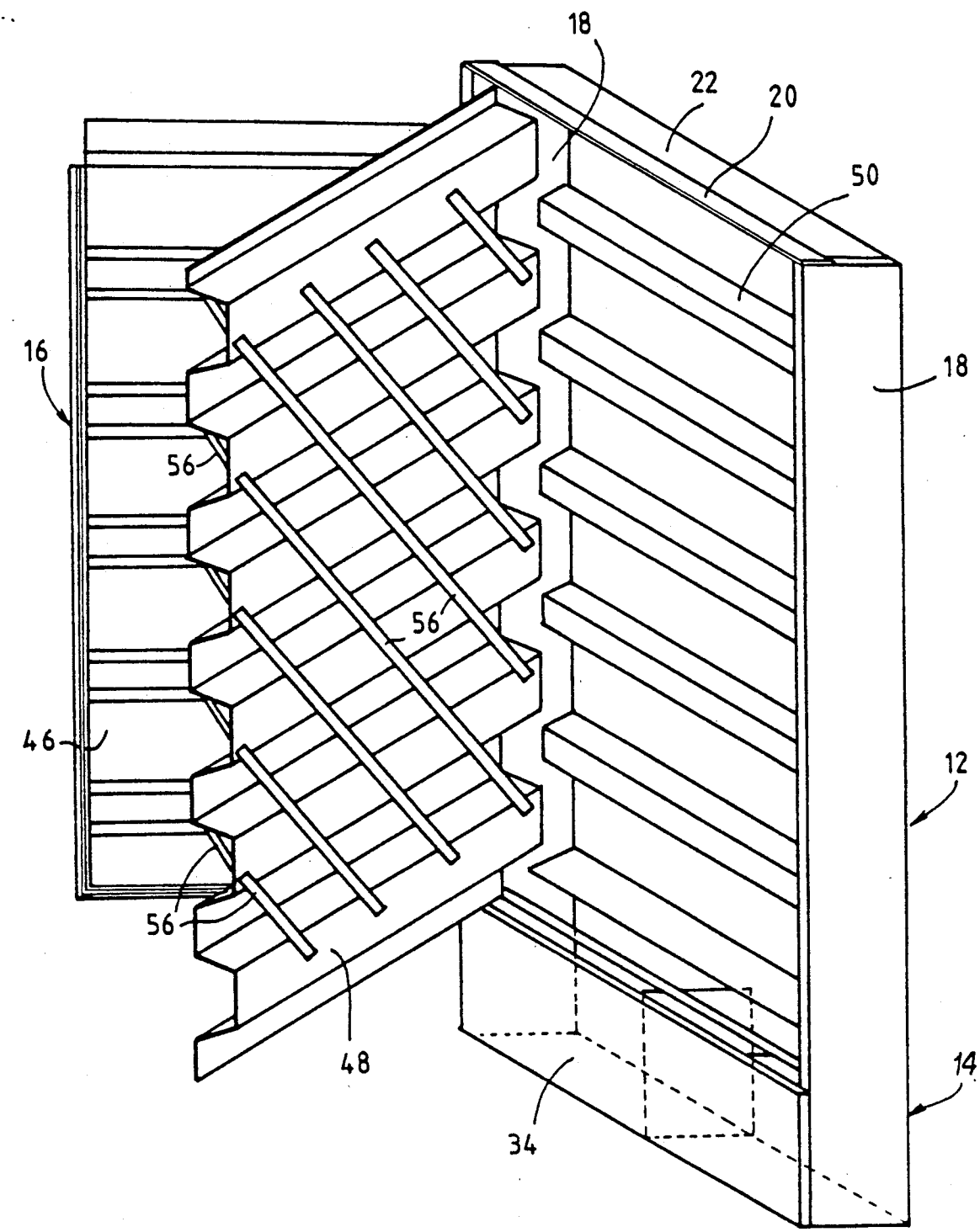

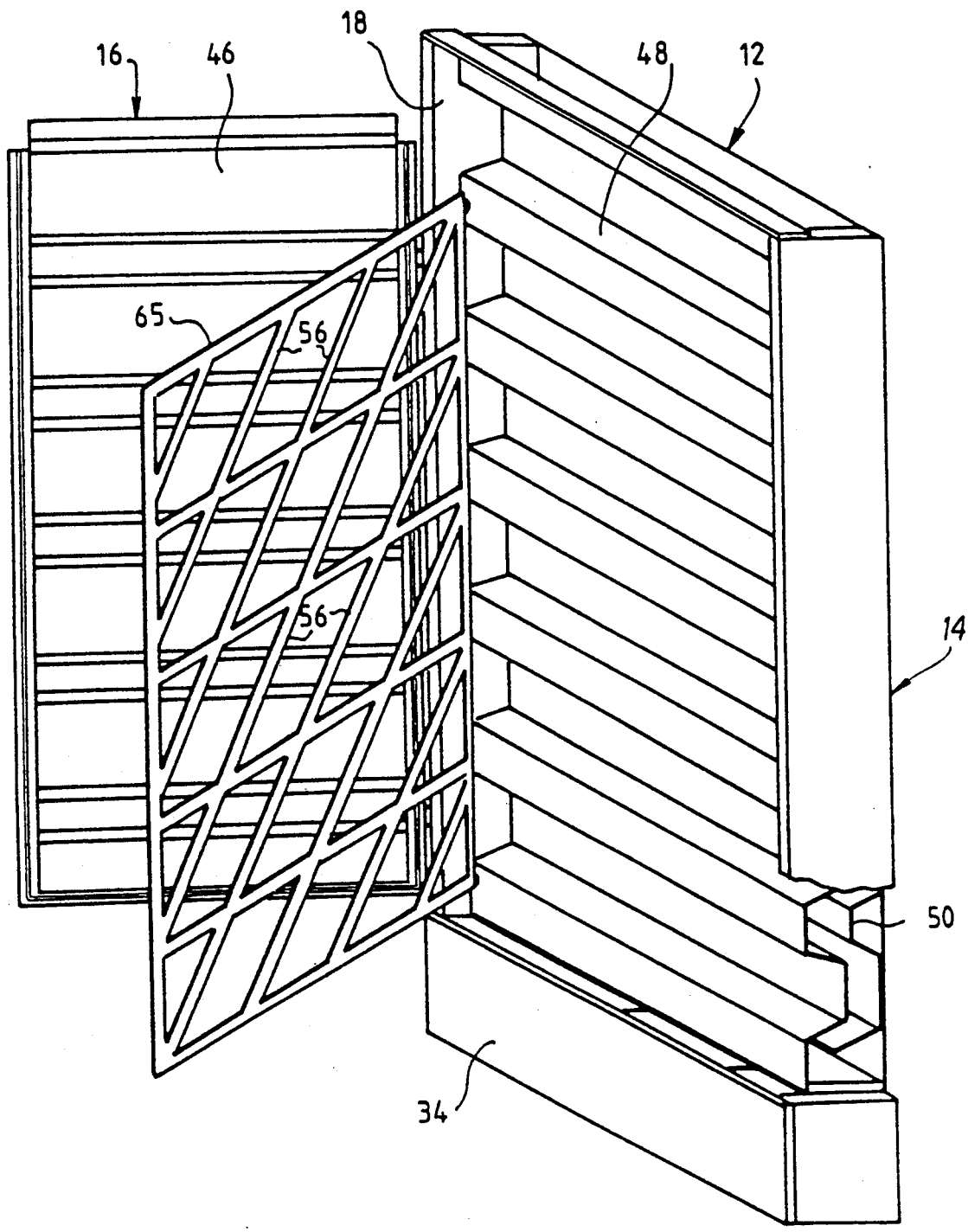

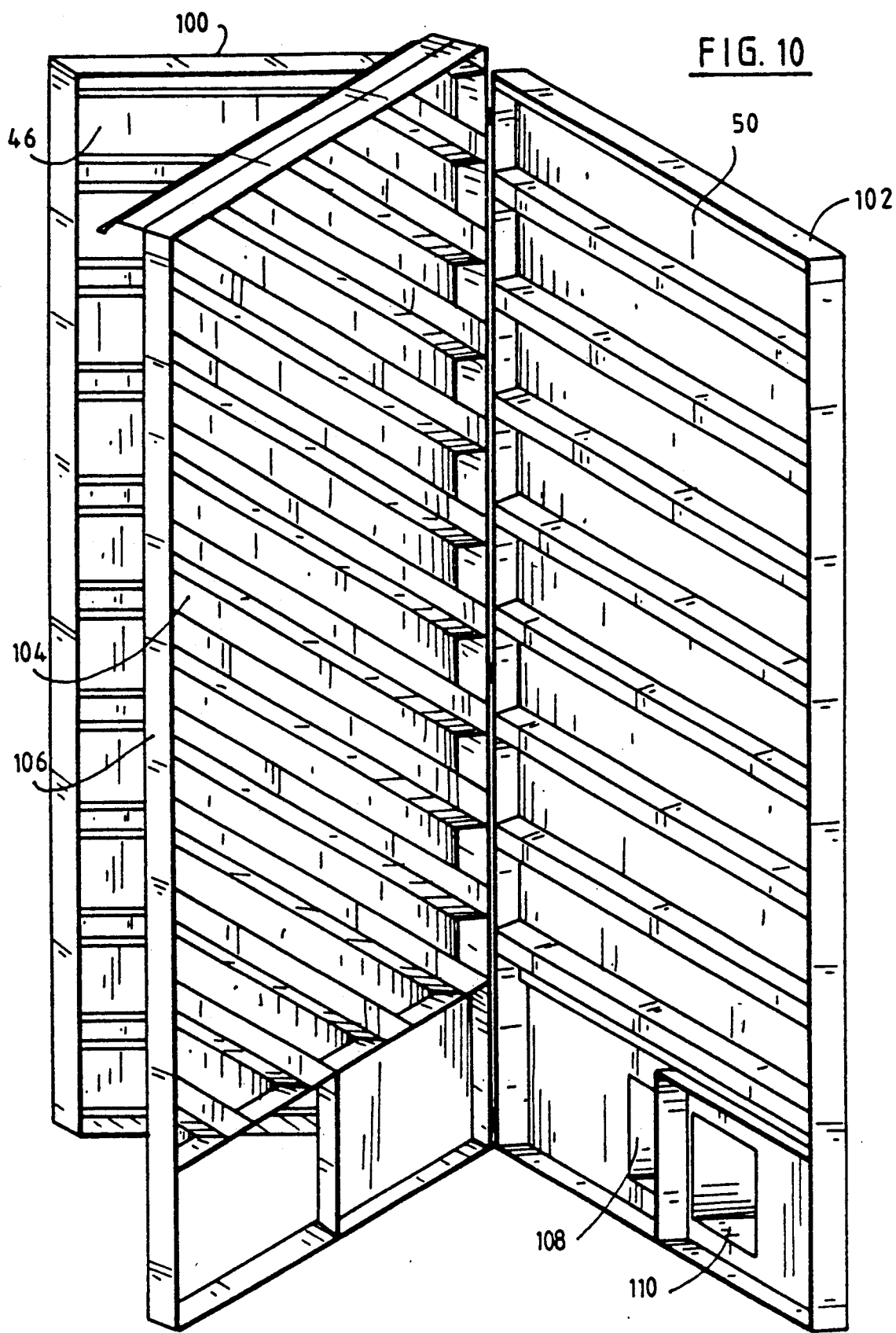

INDEPENDENT UNIT FOR HEAT EXCHANGE BETWEEN A PRIMARY FLUID AND A SECONDARY FLUID, PARTICULARLY AIR FOR VENTILATION AND AIR CONDITIONING OF A ROOM

This is a continuation of copending application Ser. No. 07/245,316 filed on Oct. 6, 1988 now abandoned.

The invention relates to an independent unit for heat exchange between a primary fluid and a secondary fluid, in particular air for the ventilation and air conditioning of a room or of an area in a building, said unit being equally suitable for operation as a solar collector, as well as a water-water heat exchanger, for example for the recovery of heat from domestic water before its discharge into the sewers.

Independent ventilation or air conditioning units for an area or a room are already known which comprise a heat exchanger of the conventional type operating between the outside air introduced into the room and the inside air which is expelled to the outside. These exchangers have a very low output and rapidly become soiled with the result that they quickly become virtually unusable. It is almost impossible to clean them correctly, even using compressed air or acids. They are, moreover, associated with fans revolving at high speed to ensure an adequate supply of air through the exchanger which consume energy and which are particularly noisy, with the result that their installation in an office or room is very badly tolerated.

Independent conditioning units based on the principle of the heat pump are also known. However, these units have a very high prime cost and suffer from the inconveniences associated with the inherent principle of the heat pump. In addition, they do not provide for the ventilation of the room or area in which they are installed.

It is the object of the invention to provide an independent ventilation and conditioning unit for a room or an area which does not present the above-mentioned disadvantages and which, in particular, has a very low prime cost, which has great viability, which functions without noise with a high output and the installation, maintenance and servicing of which are particularly simple and easy to carry out.

The invention therefore proposes an independent heat exchange unit between a primary fluid and a secondary fluid, in particular air for the ventilation and conditioning of an area or a room in a building, comprising a heat exchanger traversed by the primary fluid and by the secondary fluid and at least one organ for circulating the fluid in the exchanger, characterized in that the exchanger takes the form of a casing, for example a parallelipipedal casing, comprising substantially parallel walls of which at least one is easily moveable or pivotally mounted about one of its sides to permit access to the other walls, said walls delimiting between themselves two substantially identical fluid passages in which circulate in counter current the primary fluid and the secondary fluid, said fluid passages having a corrugated shape in section, the sections of fluid passage in the exchanger being such that the speed of fluid circulation therein is low and less than about 1 meter per second in normal use.

A unit of this type is capable of ensuring a supply of air comprising between about 20 and 40 m³ of air per hour and thus of ensuring very satisfactory ventilation of a room or an area of normal dimensions when it is associated with a volumetric or dynamic fan turning at low speed (for example of the order of 500 to 800 revolutions per minute for a volumetric fan and of approximately 1200 revolutions per minute for an axial dynamic fan) the operating noise of the fan then being more or less inaudible.

The exchange of heat between the primary air and the secondary air normally occurs with a yield higher than 60% and, in general, comprising between 75 and 80% in such a way that the outside air introduced into the room is, depending on the case, cooled or heated by the inside air designed to be expelled outside, the ventilation of the room thus being effected without bringing about a notable change in the temperature inside the room.

There results, in cold weather, a significant saving in heating of the order of 25 to 30% since the ventilation of a room is permanently assured without it being necessary to open the windows and of allowing hot air from the room to escape and be replaced by the cold outside air which would then have to be heated to the desired temperature.

The present invention also has important advantages in hot weather since the outside air is cooled before being introduced into the room, by exchange of heat with the air of the room which is expelled to the outside.

In addition, since the fluid passages in the exchanger have a corrugated section, the outside air which is introduced into the room after passage in the exchanger is de-dusted to a considerable extent, the dust being deposited on the corrugations of the corresponding fluid passage.

According to another characteristic of the invention, these fluid passages are accessible from the outside on substantially all their surface, in particular to permit their cleaning, thanks to the fact that the above-mentioned walls are easily removed or pivotally mounted about one of their sides.

It is therefore sufficient to open the casing constituting the unit of the invention to gain access to the entire surface of the fluid passages, thus making it possible to clean these very easily and to remove dust, grease, etc. accummulating therein.

According to another characteristic of the invention, each fluid passage comprises elongated turbulence generator elements which are disposed between the two walls defining said passage and which extend across the above-mentioned corrugations, each turbulence generator element preferably being in contact with the peaks of at least some of the corrugations of a wall and of at least some of the corrugations of the other wall.

This improves the exchange of heat between the primary fluid and the secondary fluid which is effected both by conduction and by convection.

In addition, the outward facing surfaces of the walls defining the fluid passages can be of a colour favouring the absorption and emission of heat to increase the exchange of heat by radiation between the primary fluid and the secondary fluid.

In a special embodiment the unit of the invention presents a casing shape having a height of about 1.3 meters, a width of the order of 80 centimeters to 1 meter and a thickness of about 15 centimeters, this casing being disposed against the internal face of an outside wall or perpendicular to this internal face, the fluid passages being of generally vertical orientation and communicating at their upper end with the inside of the room and, at their lower end, with the outside of the room by means of a conduit extending through the outside wall.

In one embodiment the unit comprises three parallel walls, one of which is attached to the wall.

For preference, one layer of thermally insulating material is disposed between the wall and the corresponding wall of the unit and a layer of insulating material covers the face of the wall of the unit which is directed towards the inside of the room.

In another embodiment, the unit comprises two parallel walls, the role of the third wall between played by the outer wall of the building.

Means for heating, cooling, drying or humidifying the air may if desired be provided in the casing at one end of the air passages.

In the following description, provided for purposes of example, reference is made to the enclosed drawings, in which:

FIG. 4 shows this unit in perspective, its second wall also being open;

FIG. 5 is a corresponding view to FIG. 4, but for a variant embodiment of the invention;

FIG. 10 is a perspective view of another variant of the unit according to the invention, shown completely open;

Figure 1:
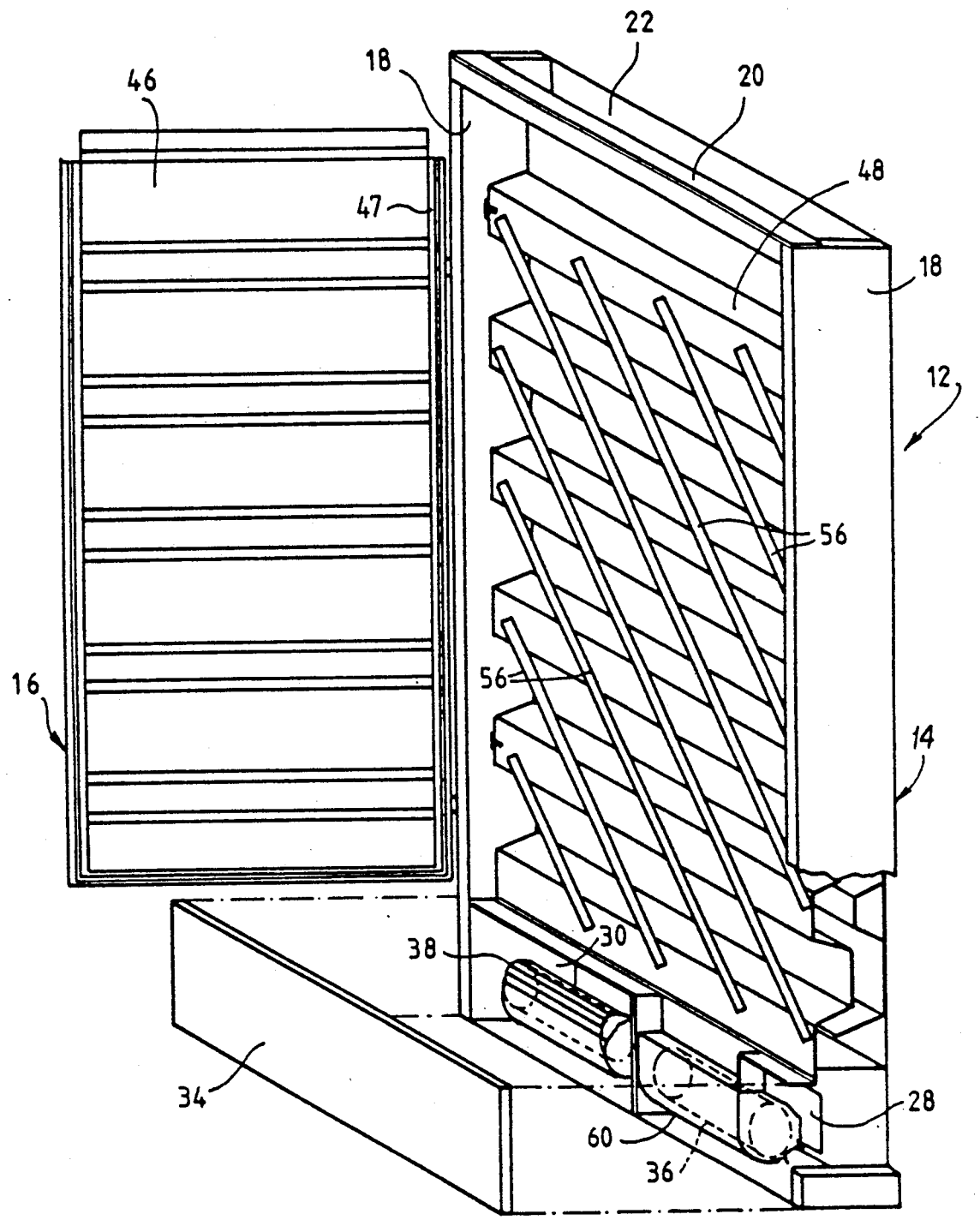
FIG. 1 is a schematic perspective view of a ventilating and conditioning unit according to the invention, shown open.

Reference is first made to FIGS. 1 to 4 showing a ventilation and conditioning unit according to the invention designed to be mounted in a room or an area of a building, for example against the internal face of an outside wall 10.

This unit presents in the form of a parallelipipedal casing 12 having a height of the order of 1.3 meters, in this example, a width of the order of 80 centimeters to 1 meter and a thickness of 15 to 20 centimeters.

This casing 12 comprises a large rear wall 14 applied on the inside face of the wall 10, a large anterior wall 16, which is easily moveable or pivotally mounted around one of its vertical sides on the casing 12, two lateral vertical walls 18, an upper horizontal wall 20 comprising an orifice 22 for passage of air and a lower horizontal wall 24 one part of which can form a moveable or pivoting trap as will be seen from the following text.

The outside wall 10 is pierced by a horizontal conduit 26, for example, having a rectangular section which opens into the lower part of the casing 12 and which is divided into two compartments 28 and 30 having the same dimensions by a vertical division 32. The two compartments 28 and 30 as well as the vertical division 32 extend horizontally into the inside of the casing 12 and are closed on the front side of this casing by a vertical panel 34 fixed for example in moveable manner to the lower end of the lateral walls 18 of the casing.

Each compartment 28, 30 contains a fan 36, 38 respectively, such as a volumetric fan having a horizontal axis of rotation, which are propelled in opposing direction of rotation by the same motor means, for example an electric motor or possibly a clockwork mechanism with counter weights.

Above the compartments 28 and 30, the casing 12 comprises two air passages 40, 42 which extend over the entire width of the casing and up to the upper end thereof, the passage 40 communicating with the compartment 28 at its lower end and opening at its upper end to the outside of the casing by an orifice 44 formed between the upper horizontal division 20 of the casing and the upper end of the front wall 16 thereof, whereas the passage 42 communicates with the compartment 30 at its lower end and with the orifice 22 at its upper end.

These air passages 40 and 42 are delimited by the lateral walls 18 of the casing, on the one hand, and by three substantially parallel corrugated panels 46, 48 and 50 on the other hand.

The corrugated panel 46 is fixed on the internal surface of the front wall 16 of the casing and presents horizontal corrugations having a trapezoidal section. This panel 46 can be mounted in the inside of a rectangular frame 47, facilitating its pivotal mounting along one of its vertical edges and its external face is covered by a layer of insulating material 49 filling, for example, the hollows of the corrugations, which is itself covered by a facing 52 forming the external surface of the front wall 16 of the casing.

The intermediate panel 48 is also a panel formed with horizontal corrugations having a trapezoidal section which is easily mounted moveably or pivotally on a lateral wall 18 of the casing, along one of its vertical sides. In common with the panel 46, the intermediate panel 48 can be mounted in the inside of a rectangular frame facilitating its pivotal mounting in the inside of the casing.

The third panel 50 also presents horizontal corrugations of trapezoidal section and is fixed on the rear wall 14 of the casing with interposition of a layer of insulating material 54 which fills for example the hollows of the corrugations of the panel 50.

Figure 3:
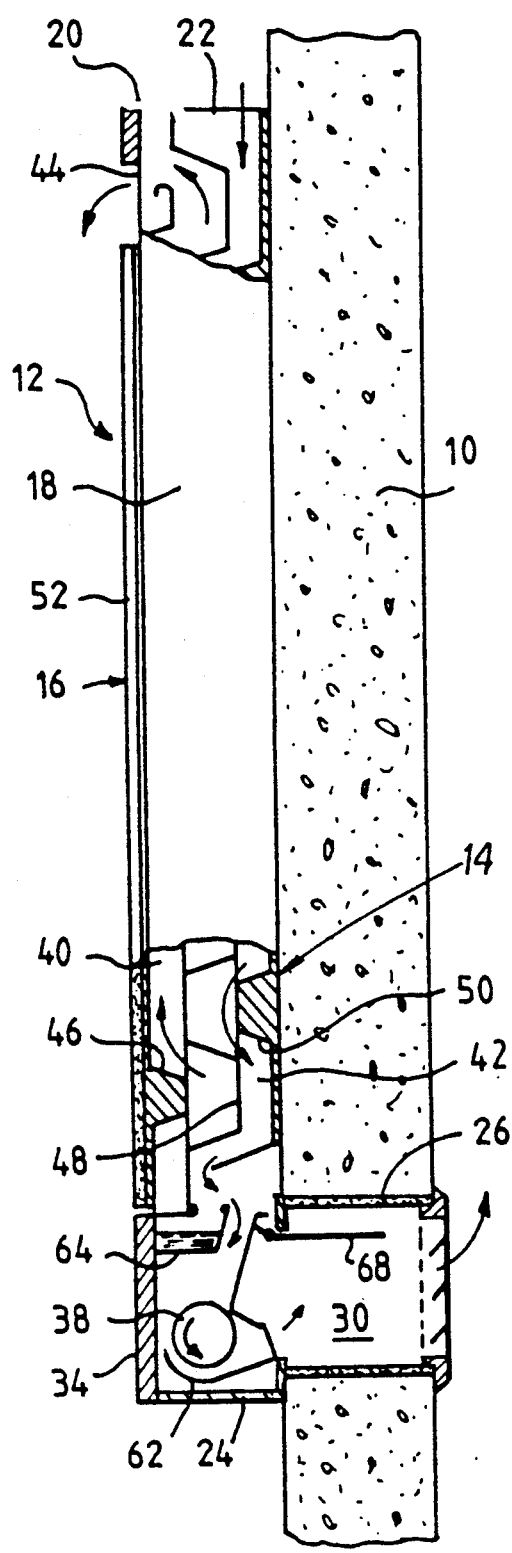
FIGS. 2 and 3 are views in transverse vertical section of this unit.
Figure 2:
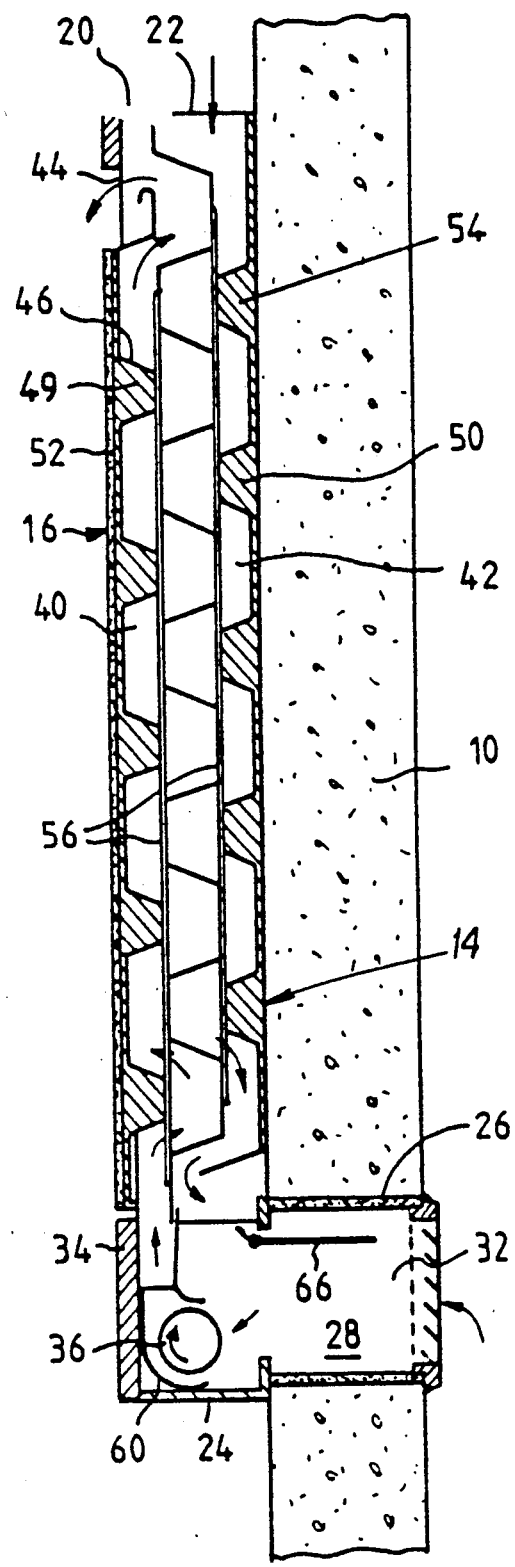

As may be seen from FIGS. 2 and 3, the corrugated panels 46, 48 and 50 are disposed in relation to each other in such a way that the peaks of their corrugations correspond horizontally, the panels not being staggered in relation to one another in the vertical direction.

The passages of the fluids 40 and 42 which are thus delimited between these three panels have a vertical corrugated form.

In addition, each of these passages of fluid comprises turbulence generator elements 56 which, in the example shown, are flat bars of low thickness, parallel to one another and extending obliquely on the peaks of the corrugations of the intermediate panel 48, at equal distance from one another and on the two faces of this intermediate panel 48. These flat bars 56 are, for example, fixed by bonding, by soldering or by any other appropriate means on the plane peaks of the corrugations of the intermediate panel 48. The arrangement is such that, when the casing 12 is closed, the plane peaks of the corrugations of the first panel 46 are in contact with the turbulence generator elements 56 and the plane peaks of the corrugations of the third panel 50 are also in contact with the elements 56 fixed to the other face of the intermediate panel 48.

It may be stated, by way of example, to clarify the concept, that the corrugations of the intermediate plate 48 are about 50 millimeters in height and that those of the plates 46 and 50 have a height of about 40 millimeters.

The unit which has just been described functions in the following manner:

The casing being closed (as shown in FIGS. 2 and 3), the rotors of the volumetric fans 36 and 38 are propelled in rotation in opposite directions to one another with a speed of rotation which is of the order of 500 to 800 revolutions per minute.

The rotor of the fan 36 turns inside a sheath 60 disposed in such a manner that this fan draws in outside air via the compartment 28 and compresses it into the passage 40 from whence this air escapes via the orifice 44 in the upper part of the front wall of the casing, as shown by the arrows. The rotor of the fan 38 turns inside a sheath 62 disposed in such a manner that the air is drawn into the passage 42 which communicates in its upper part with the inside of the room via the orifice 22 and is compressed into the compartment 30 from whence it is expelled to the outside.

The air introduced into the room and the air taken from the room therefore circulate in counter current in the passages 40 and 42 of the casing 12. The corrugated shapes of these passages and the presence of the elongated elements 56 favour an exchange of heat at high output (75 to 80%) between the air taken from the outside and introduced into the room and the air taken from the room and expelled to the outside. The elongated elements 56 also form a thermal point between the corrugated panels 46, 48 and 50.

In addition, to further favour an exchange of heat there is provision that the facing surfaces of the panels 46, 48 and 50 are in a colour favouring the absorption and transmission of heat by radiation.

Depending on whether the outside temperature is lower or higher than the inside temperature of the room, the outside air introduced into the room is heated or cooled in the inside of the casing 12 by the air taken from the room and expelled to the outside.

The dimensions of the sections of the air passages 40 and 42 are chosen in such a manner that the air speed in these passages is less than one meter per second in normal use and is in general equal to 0.4 or 0.5 meters per second.

The speeds of rotation of the volumetric fans 36 and 38 which are needed to obtain these speeds of air flow are very low, with the result that the fans consume very little energy and are virtually silent, their noise of operation being more or less inaudible in a bedroom or an office.

It is advantageous to provide a gutter 64 at the lower end of the passage 42 in which the air taken from the room circulates. When this air is cooled by heat exchange with the air introduced into the room, condensation may form on the walls of the passage 42 and the water of condensation is then collected in the gutter 64.

It is also advantageous for the part of the lower horizontal wall 24 of the casing 12 which is located below the fan 38 to comprise or form a pivoting trap 62 in such a manner that the air in the room can be drawn in directly by said trap without passing through the passage 42. One can also draw in directly the air contained in the room and expell it to the outside by replacing this air by the outside air drawn in by the fan 36 and circulating in the passage 40 in order to remove its dust particles before being introduced into the room. The outside air is thus admitted into the room without heat exchange with the inside air. This characteristic of operation is of interest in the summer or in hot countries when the unit is operated during the night to bring fresh air into a room, the temperature of which is higher than the outside temperature. In contrast, during the day the trap should be closed so that the outside air which is then at a higher temperature than that of the room is cooled by heat exchange with the inside air before being introduced into the room.

The maintenance and cleaning of the unit of the invention are particularly simple: it suffices to remove or to open by pivoting, depending on the situation, the front wall of the casing and the intermediate corrugated panel 48 to gain access to all the surfaces of the air passage and to clean them of dust, grease, etc. accumulated thereon.

This cleaning is further facilitated by arranging, as shown in FIG. 5, for the turbulence generator elongated elements 56 to be linked amongst themselves by a rectangular frame 65 pivotally mounted along one of its vertical sides on a lateral wall 18 of the casing 12 or on the intermediate corrugated panel 48.

One can also arrange, as shown in FIGS. 2 and 3, pivoting shutters 66 and 68 in the compartments 28 and 30 respectively to close and seal the conduit 26 through the outside wall 10 when the ventilation and conditioning unit is not being used.

Figure 6:
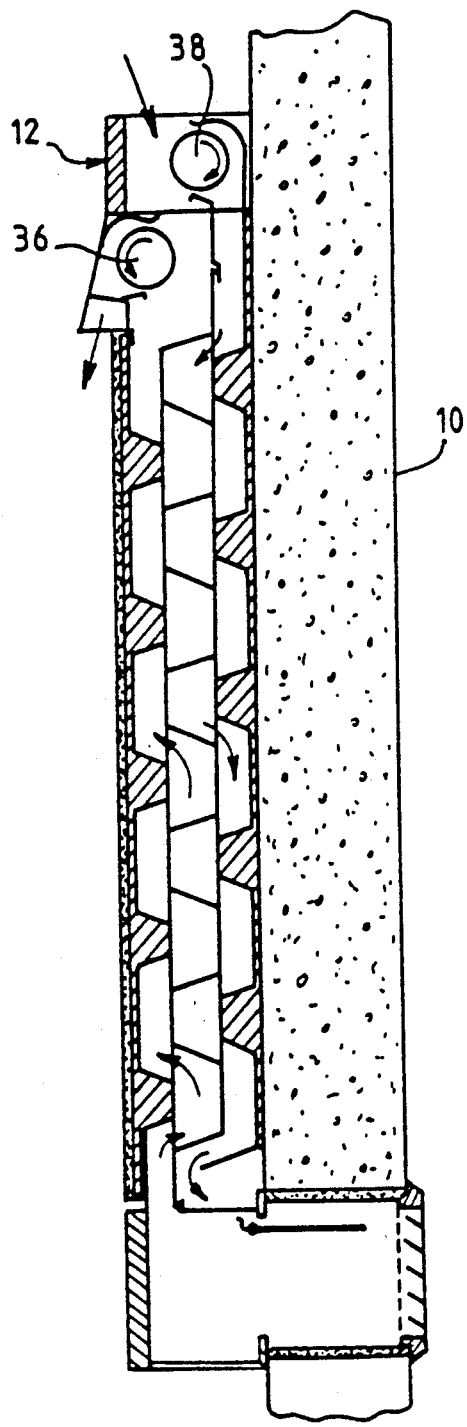
FIG. 6 is a transverse vertical sectional view of an embodiment of a unit according to the invention.

Reference is now made to FIG. 6 showing an embodiment of the invention in which the fans 36 and 38 are mounted in the upper part of the casing 12 instead of being in the lower part. In other respects the structure and the functioning of this embodiment of the invention are identical to those of the unit shown in FIGS. 1 to 4.

Figure 7:
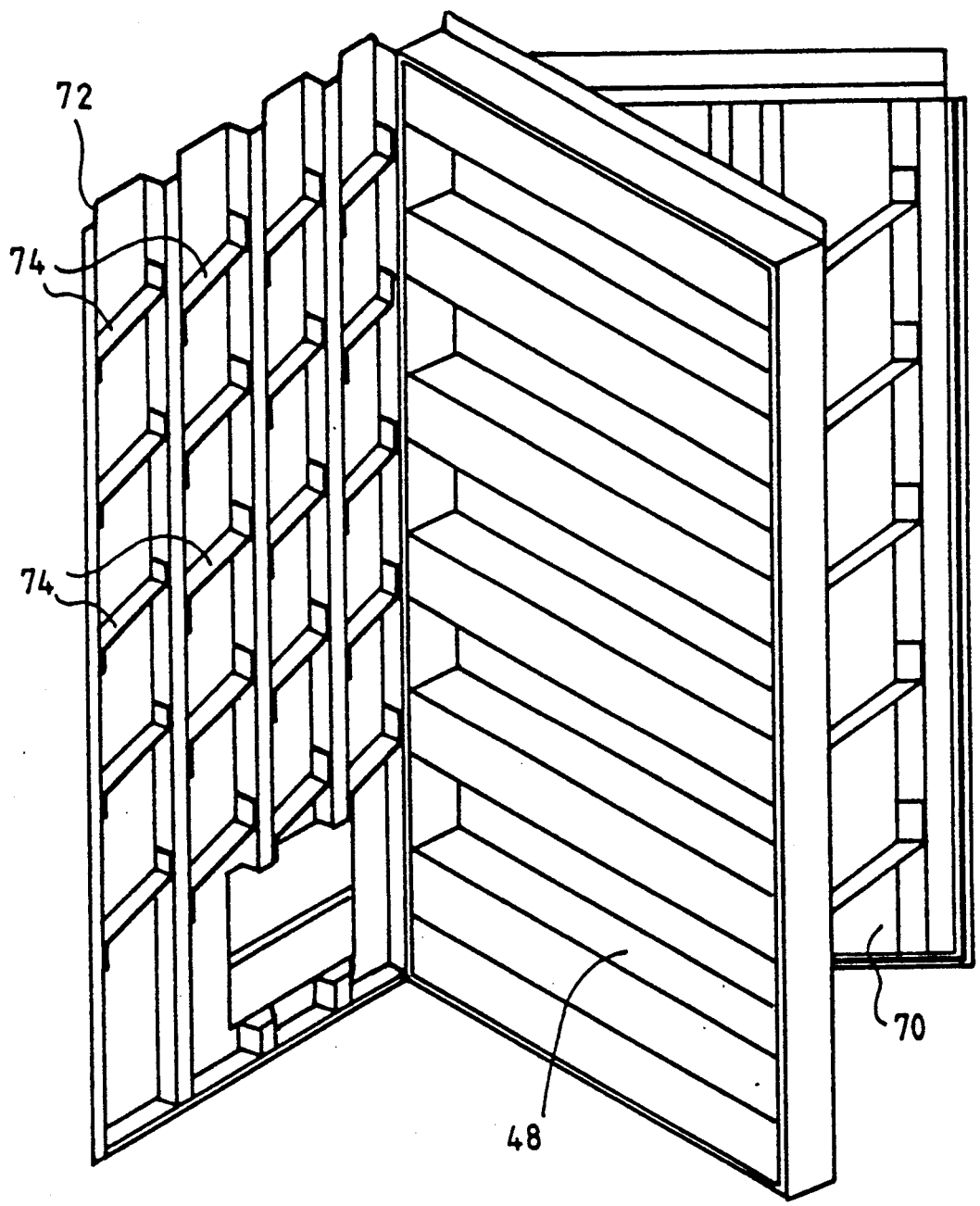
FIG. 7 is a perspective view of another embodiment of a unit according to the invention, this being shown completely open.

Reference is now made to FIG. 7, representing a further embodiment of the invention in which the horizontal corrugated panels 46 and 50 are replaced by vertical corrugated panels 70 and 72, the intermediate panel 48 not being modified and presenting as before horizontal corrugations. The turbulence generator elements can, in this case, be oblique bars 74 disposed across each corrugation of the panel 70 (or 72 respectively) and fixed to the wall of these corrugations.

Moreover, the turbulence generator elements could also be disposed obliquely across the horizontal corrugations of the intermediate panel 48 and would thus present a projecting part designed to enter partially into the vertical corrugations of the panels 70 and 72.

Figure 8:
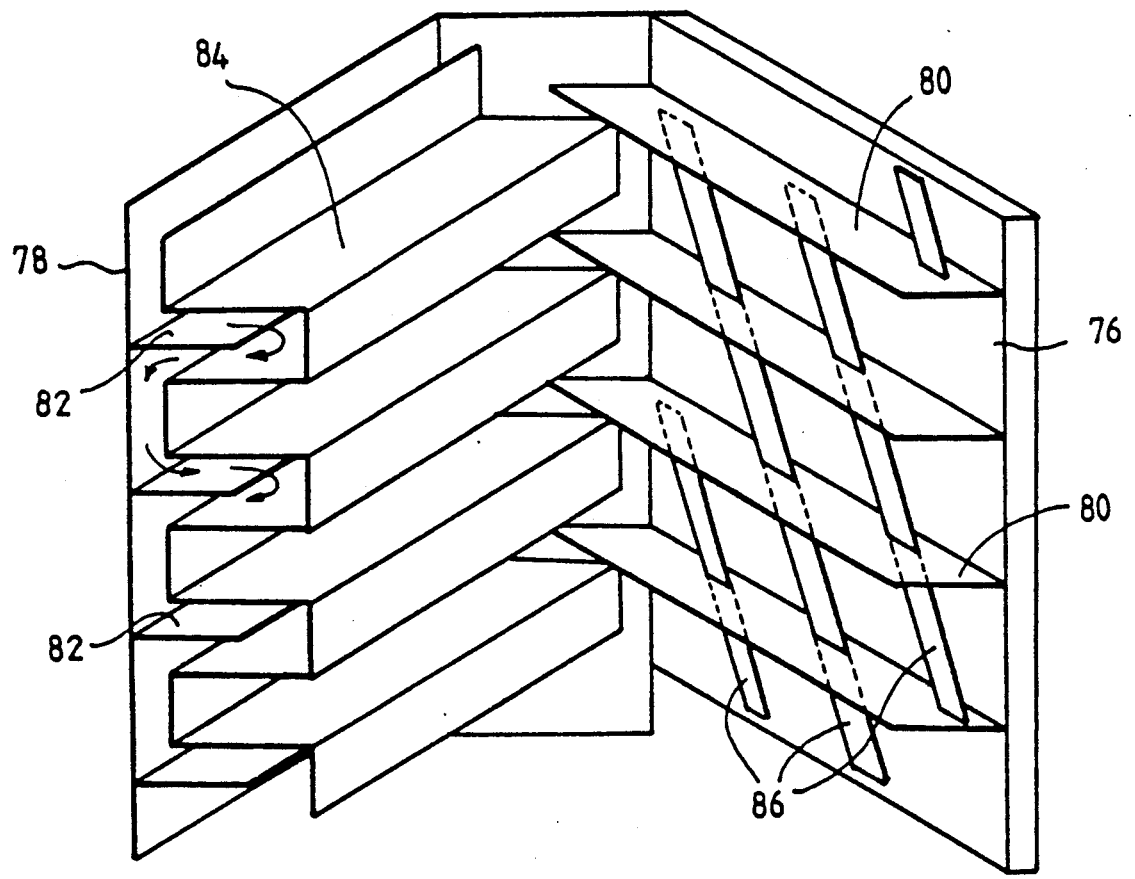
FIG. 8 is a simplified perspective view of another embodiment of a unit according to the invention.

Reference is now made to FIG. 8 which represents schematically another embodiment of the invention. In this embodiment, the corrugated panels 46 and 50 represented in FIGS. 1 to 4 are replaced by planar panels 76 and 78 provided on one of their faces with small plates 80, 82 respectively which are parallel to one another and perpendicular to the panel 76, 78 and which engage in the horizontal corrugations of rectangular section of an intermediate panel 84.

Between the small panels 80 (and 82 respectively) of the panel 76 (or 78 respectively) there are interposed narrow bands 86 which extend obliquely and which impinge on the peaks of the corrugations of the intermediate panel 84 when the casing is closed.

Figure 9:
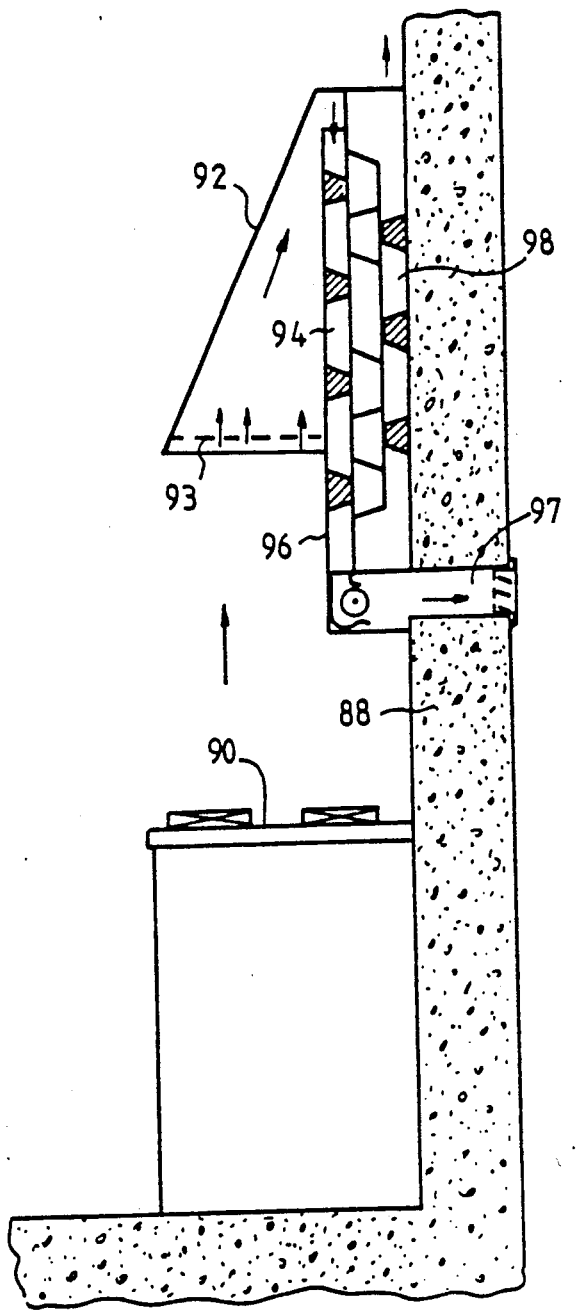
FIG. 9 is a schematic transverse sectional view of a unit according to the invention used as a kitchen hood.

FIG. 9 shows schematically, in transverse vertical section one application of the invention on a kitchen hood, mounted on an outside wall of a building 88 above a cooking surface 90. The hood itself 92 comprises, in the conventional manner, a filter 93 in its lower section designed to receive part of the grease transported by the cooking fumes and steam.

In the upper part the hood 92 communicates with an air passage 94 of a unit 96 according to the invention the lower part of which is linked to a conduit 97 extending through the outside wall and comprising two compartments, one of which is linked to the air passage 94 and the other of which is linked to the other air passage 98 of the unit 96, said passage 98 opening to the inside of the room at its upper end.

It is understood that the cooking fumes and steam are drawn into the inside of the hood 92, circulate in the passage 94 and are expelled to the ouside by the conduit 97 whilst the outside air is admitted into the unit 96, circulates in the passage 98 and is heated by heat exchange with the cooking steam and vapours before being introduced into the room.

There has been represented in FIG. 10 a particularly interesting embodiment of the invention. In this embodiment, the ventilation and conditioning unit comprises a corrugated panel 46 identical to that of FIG. 4, mounted in a frame 100 to form its front wall and a corrugated panel 50, identical to that of FIG. 4, mounted in a frame 102 to form its rear wall applied to a wall of a building. Unlike in FIG. 4, the intermediate wall is a panel 104 of oblique corrugations having a rectangular or trapezoidal section, said panel being mounted in a frame 106. When the unit is closed, the peaks of the oblique corrugations of the panel 104 are in the immediate vicinity and in contact with the peaks of the horizontal corrugations of the panels 46 and 50 and thus delimit air channel passages having a particularly sinuous shape.

In this embodiment the outside air circulates between the panels 50 and 104 from bottom to top and the inside air circulates between the panels 46 and 104, from top to bottom. To short-circuit the passage of the interior air in the unit, it suffices to slightly open the front wall of the unit, formed by the panel 46 and the frame 100. In addition, the volumetric fans can be replaced by dynamic fans of the axial type, which are easier to clean and which are moveably mounted in the conduits 108, 110 extending through the wall.

Figure 11:
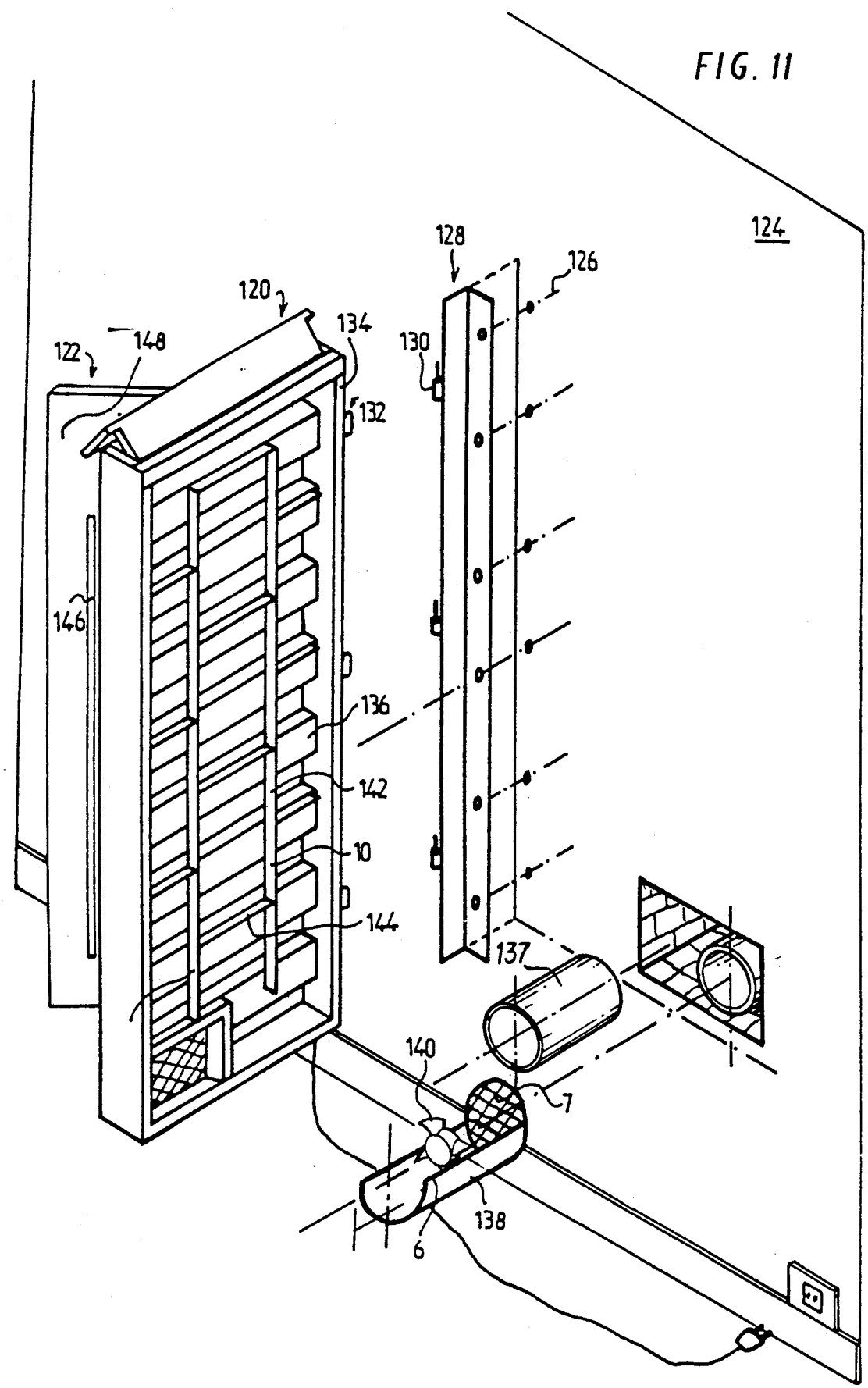
FIG. 11 is a perspective view of another embodiment of the unit according to the invention.

Reference is now made to FIG. 11 which shows schematically in perspective view another embodiment of the unit of the invention. In this embodiment the unit comprises two panels or walls, 120 and 122 respectively, and not three as in the preceding embodiments, the role of the third wall being played by the wall 124 of the building. Against said wall there is fixed by means of screws schematized in 126, a vertical angle iron 128 on which are fitted the male elements of hinges 130 suitable for cooperating with the female elements 132, which are fixed to a posterior frame 134 of the panel 120. The other panel, 122, is itself mounted by means of hinges, to the anterior edge of the panel 120 in such a way as to be able to open, slightly or completely, in relation to said panel.

The panel 120 comprises a corrugated panel 136 imposing an ascending corrugated or sinuous path to the incoming air which reaches it by a sheath 137 extending through the wall of the building 124 and in which there is lodged a fan, not shown.

As in the preceding embodiments the air to be evacuated follows a descending course, also sinuous, in the corrugated span between the panel 120 and the panel 122, the corrugated panel either being capable of being fixed to the first panel or else fixed to the second panel. The air in the room escapes at the lower part via a sheath 138 extending through the wall of the building 124 and in which there is a fan 140.

Turbulence devices composed of vertical 142 and/or horizontal 144 strips favour the thermal exchanges between the flux of incoming air and the flux of outgoing air. Such turbulence devices may also be provided in the path of the flux of outgoing air. Such a turbulence device has been shown at 146 mounted on the panel 148 constituting part of the panel 122.

The mounting and dismantling of such a unit is particularly simple and quick.

The cleaning of the surfaces in contact with the air is easily carried out.

According to one mode of operation the panel 148 forming part of the panel 122 is partly open.

In the embodiment shown in FIG. 11, the sheath 136 is embedded in the wall, but is nevertheless accessible to enable it to be washed there.

On the other hand, the sheath 138 can easily be extracted from the wall with its fan, the grille and possibly the mosquito screen, said dismantling facilitating cleaning.

The ventilation and conditioning unit of the invention may also be used for the ventilation of areas in which a particularly humid atmosphere prevails. Indeed, the outside air which is introduced into the area is dried when it is reheated by heat exchange with the air extracted from the area. It is thus possible to remove from an area or a room the humidity prevailing therein or produced therein.

It is often found necessary to provide means for humidifying the air at the exit of the casing to humidify the outside air which is introduced in a room. These means can comprise a reserve of water serving to humidify a cloth over which the air to be introduced into the room passes.

One can also dispose these humidifying means in the passage of air which is taken from the room and which will be expelled to the outside to cool this air at the entrance to the air passage and thus to further cool the air which will be introduced into the room (in the case of hot weather or a hot climate).

One can also provide supplementary means for heating the air which will be introduced into the room, for example an electrical resistance or similar, or else means of cooling the air, for example, using the Peltier effect.

In general, the invention makes it possible to ensure the ventilation and conditioning of a room by outside air which, before being introduced into the room, is automatically heated or cooled depending on requirements and cleaned of its dust particles or similar without it being necessary to use a filter of the conventional type. Moreover, the unit of the invention is very simple and convenient to install and maintain.

The unit of the invention may also be devised in such a way that the fluid passages are watertight and may thus be applied to the recovery of heat from used domestic water before its discharge into the sewers.

Another important advantage of the invention is its low energy consumption, the fans being propelled at low speed and, moreover, being particularly silent in operation.

The panels defining the air passages can be produced in any material and can comprise or define horizontal, vertical or oblique corrugations.

In all the embodiments it is possible to make the air penetrate directly from the outside into the room and/or to evacuate the air directly from the room to the outside in such a way as to avoid heat exchanges.

I claim:

1. An independent unit for the exchange of heat between a primary fluid and a secondary fluid, such as air, for the ventilation and air conditioning of a room inside a building, comprising a heat exchanger arranged for traversing by the primary fluid and by the secondary fluid, said heat exchanger having a vertically mounted parallelepipedic casing including two substantially identical vertical fluid passages for the circulation of said primary fluid and the secondary fluid respectively in opposite directions; at least one circulation member for circulating at least one of said fluids; said casing comprising substantially vertical parallel walls, at least one of which includes means for opening said one wall from said casing while said casing is mounted to permit access to the other walls, in particular for their cleaning, said walls delimiting between themselves said two fluid passages, said walls having corrugations such that said two fluid passages have, in the vertical direction, a corrugated form; said fluid passages further having horizontal sections along a width selected such that the speed of circulation of the fluid there is generally less than about 1 meter per second; and wherein each of said two fluid passages further comprise elongated turbulence generator elements disposed between two walls defining said fluid passage and extending across said corrugation.

2. A unit according to claim 1, having three substantially parallel walls (46, 48, 50), namely a front wall, a rear wall and an intermediate wall, one of said two fluid passages being delimited between the front wall and the intermediate wall, and the other of said two fluid passages being delimited between the rear wall and the intermediate wall.

3. A unit according to claim 1, having two substantially parallel walls (120, 122), namely a front wall and a rear wall, one of said two fluid passages being delimited between the front wall and the rear wall, and the other of said two fluid passages being delimited between the rear wall and a wall of the building.

4. A unit according to claim 1, wherein the two fluid passages (40, 42) of the exchanger are accessible from the exterior along substantially their entire surface in particular for their cleaning.

5. A unit according to claim 1, wherein the corrugations of said two walls defining the fluid passage have peaks and wherein each of the turbulence generator elements (56, 142, 144) is in contact with the peaks of at least some of the corrugations of one of said two walls and of at least some of the corrugations of the other of said two walls.

6. A unit according to claim 1, wherein the turbulence generator elements (56, 142, 144) are rectilinear flat bars disposed in a same plane, parallel to each other and obliquely oriented in relation to the general direction of fluid flow in the fluid passages.

7. A unit according to claim 1, wherein the corrugations of said two walls defining the fluid passage have peaks and wherein the turbulence generator elements are fixed to the peaks of the corrugations of one of the said two walls.

8. A unit according to claim 1, wherein the turbulence generator elements are joined together by a peripheral frame having an edge around which said frame is pivoted.

9. A unit according to claim 1, wherein the walls delimiting the fluid passages (40, 42) have corrugations which are parallel to one another and perpendicular to the general direction of fluid flow in said passages.

10. A unit according to claim 1, wherein each fluid passage is formed between a wall (48, 104) having oblique corrugations and one wall (70, 72, 46, 50) having transverse corrugations with respect to the general direction of fluid flow.

11. A unit according to claim 1, wherein the outward facing surfaces of the walls (46, 48, 50) delimiting the fluid passages are of a color capable of favoring the absorption and emission of heat to increase the exchange of heat by radiation between the primary fluid and the secondary fluid.

12. A unit according to claim 1, wherein the fluid circulation member is a volumetric fan (36, 38, 140) of low speed of rotation in operation, of the order of 500 to 800 revolutions per minute.

13. A unit according to claim 12, wherein each fluid passage (40, 42) comprises, at one end, a fan (36, 38) of the above-mentioned type.

14. A unit according to claim 1, wherein the primary fluid and the secondary fluid circulating in the exchanger are air, the primary air being drawn from the room inside the building and expelled to the outside, the secondary air being drawn in from the outside and introduced into the room inside the building.

15. A unit according to claim 14, wherein said unit is disposed between the inner face of one outside wall (10) of the room, the fluid passages (40, 42) are of generally vertical orientation and communicate at their upper end with the inside of the room and, at their lower end, with the outside of the room via the intermediary of a conduit (26) extending through the wall (10).

16. A unit according to claim 15, wherein a layer (54) of thermally insulating material is disposed between the wall (10) of the room and a corresponding wall (14) of the exchanger and in that a layer (50) of insulating material covers the face of the wall (46) of the exchanger which is turned towards the inside of the room.

17. A unit according to claim 14, wherein means for heating, cooling, drying or humidifying the air are provided in the air passages of the unit.

18. A unit according to claim 1, further comprising means for allowing at will air to penetrate directly from the outside into the room inside the building.

19. A unit according to claim 1, wherein the walls delimiting the fluid passages are corrugated panels.

20. A unit according to claim 1, wherein the walls delimiting the fluid passages are flat panels presenting on at least one face a series of flanges parallel to one another and perpendicular to the panel.

21. A unit according to claim 1, further comprising means for allowing at will to directly evacuate the air from the room inside the building to the outside.

* * * * *